March 6, 1956 E. KEMNA ET AL 2,737,277
CLUTCH DRIVE FOR HOISTING GEAR
Filed Nov. 17, 1950
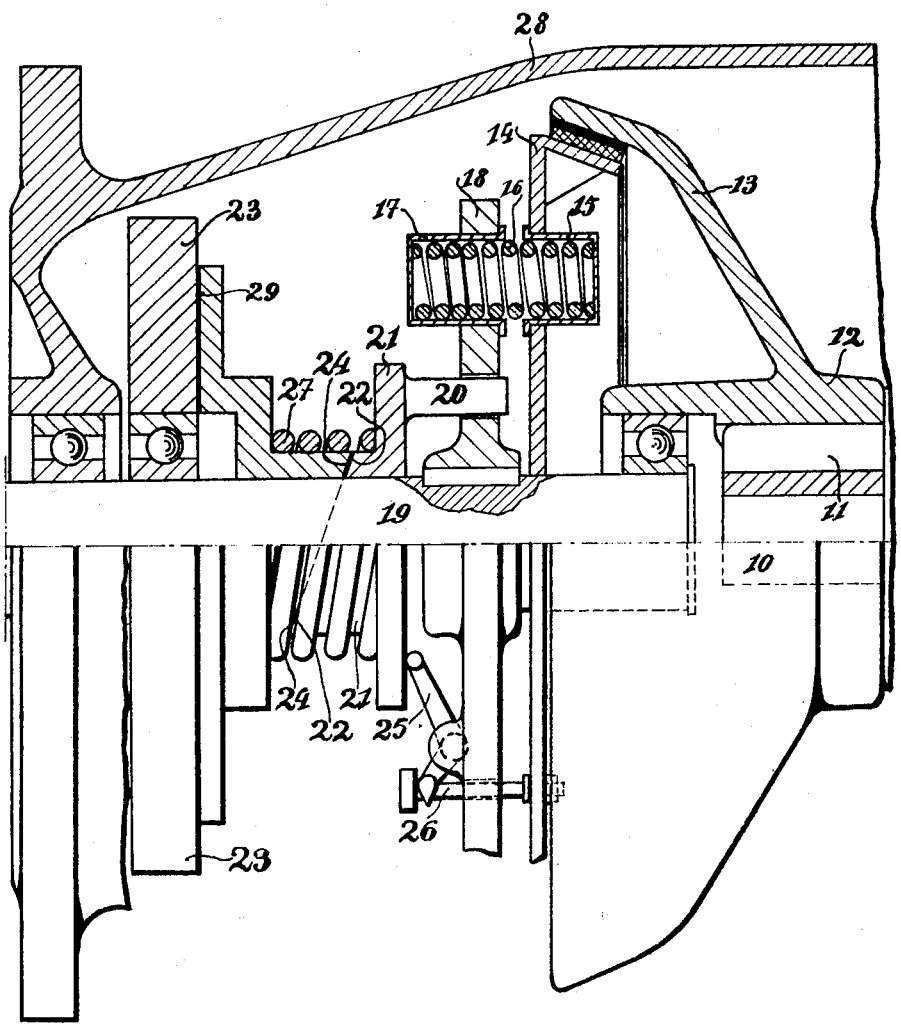
INVENTORS
Erich Kemna
Walter Vogel
BY Richard ...
AGENT United States Patent Office 2,737,277
Patented Mar. 6, 1956

2,737,277

CLUTCH DRIVE FOR HOISTING GEAR

Erich Kemna and Walter Vogel, Wetter (Ruhr), Germany, assignors to Demag-Zug G. m. b. H., Wetter (Ruhr), Germany, a German company Application November 17, 1950, Serial No. 207,410

5 Claims. (Cl. 192—103)

In certain machines, the driven part has to be accelerated slowly in order to avoid the possibility of damage. This is the case, for example, with machines for manufacturing paper, where the paper is apt to tear by reason of excessive acceleration, or with textile machines where threads may break; with packing machines having many parts, the mechanisms of which suffer if the acceleration forces are too strong; with drives for vehicles, particularly with open liquid tanks, and with drives for cranes or hoists, the load of which may start oscillating and cause accidents.

If, therefore, electric drives are used, the motors and switches are usually constructed for gradual or slow starting. It is then left to the operator to find the permissible acceleration limit, otherwise either breakdowns occur, or more time is used for the acceleration than is necessary to safeguard the driven part. The insertion of a centrifugal force coupling between the electric drive and the driven part does not achieve the purpose as, if the motor starts too quickly after the required number of rotations necessary for the centrifugal coupling force to take effect has been reached, the driven part is engaged within a relatively short time.

According to the invention, a coupling device for drive and driven part responsive to acceleration, is used consisting substantially of a rotatable mass, the lagging movement of which in relation to the quickly accelerated driving part, such as the motor shaft or an intermediate shaft, is used as a measure of the acceleration. This mass advantageously rotates and is held in the mean position, that is to say in the position of inertia, by means of springs or similar resilient means. When it moves from the mean position, it engages the driven part, for example by controlling a slip coupling between the driving motor and the driven machine. The more the mass lags, the more it breaks the connection between the motor and the driven part, that is to say, the slower is the driven part driven. If the slip coupling is constructed as a friction coupling, the acceleration indicator controls the coupling pressure.

The slip coupling may be constructed in various ways; for example, it may consist of a hydraulic coupling; or a slip gear may be used, such as when a brake engages to a greater or less degree an intermediate member.

The drive according to the invention renders it possible to accelerate the hoist as much as it can stand, so that the shortest permissible acceleration period is ensured with the least wear and tear of the hoist and the parts connected with it. In addition, the invention is of considerable importance, because the electric motors can be constructed simply, particularly as short-circuit motors. Thus, whilst hitherto particular importance was attached to the suitable construction of the starter and of the electric motor, and correspondingly complicated motors had to be used, motors of simple construction may now be used. This does not only make operation cheaper, but in addition simplifies manufacture and storage, and facilitates mass production and standardisation in general.

The invention, moreover, relates to the particular construction of the transmission means, and to the mounting of the drive in one constructional unit, which is inserted as a whole between the motor and the gearing. The driving motor as well as the driven part may then be constructed without regard to the acceleration coupling and may, if required, be simply mounted between motor and drive, such as by flanging it between motor and drive.

The invention is diagrammatically illustrated by way of example in the accompanying drawings, wherein the figure shown is a sectional elevation of the operating part of the motor drive.

Referring to the drawing, on the motor shaft 10 is mounted a pinion 11 which engages the internal teeth of the hub 12 of the coupling disc or flanged wheel 13. The counter coupling disc or flanged wheel 14 carries cup-shaped projecting containers 15 to receive the coupling springs 16 which at the other end are received in housings 17 provided in the disc or wheel 18. In this construction the coupling springs 16 serve not only for pressing the coupling discs 13 and 14 together, but also for the transmission of the torque between the discs 14 and 18 which thus operate to a certain extent elastically. The disc or wheel 18 is rigidly secured on the driven shaft 19. In addition, the disc 18 transmits its movement, through the laterally projecting arm 20, to a sleeve 21 mounted to slide on the shaft 19 and which is formed in two parts cut at an inclination with contacting surfaces 22, 24. There is furthermore, mounted on the shaft 19 a flywheel 23 which may be formed integral with the inclined counter surface 24 or may be provided in driving engagement therewith through a friction lining 29.

When the motor shaft 10 is rotated by the electric driving motor, it imparts movement directly to the plate 13, and by reason of frictional engagement between the plate 13 and the plate 14, the plate 14 is also rotated. The plate 14 transmits its movement resiliently through the spring 16 to the plate 18. The rotational movement is further transmitted through the arms 20, the sleeve 21 and the inclined contacting surfaces 22, 24 to the gyratory mass or fly-wheel 23. Due to its inertia, the flywheel 23 will lag behind in its rotation and as it cannot be displaced in the axial direction will displace the sleeve 21 to the right. This movement is also transmitted to pivoted bell-crank levers 25 which are mounted on the plate 18, and act on the spring-pressed or tension rods 26 which tend to urge the coupling plate 14 to the left, when the sleeve 21 moves to the right. This reduces the pressure applied by the coupling springs 16 and the plate 14 can slip, and the acceleration of the shaft 19 lags behind that of the motor shaft 10. The spring 27 serves merely for urging the parts 21, 25 and 26 to maintain their normal engaged position.

The inert fly-wheel, the coupling and the force-transmitting members between them are enclosed in a housing 28 which is provided as a special constructional part between the motor and the driven machine (not shown) and may be flanged to both parts.

Where higher performance is required, the torque transmission between the plates 14 and 18 is effected by a special bolt, or by any other transmitting member which at the same time renders possible an axial displacement corresponding to the wear and tear of the coupling lining.

We claim:

1. A drive for hoisting gear, comprising an electric motor, a driven part, a friction clutch mounted between said motor and said driven part, said clutch consisting of a driving member and a driven member, a plate secured on said driven part adjacent said driven member and on that side of said driven member remote from said driving member, means resiliently connecting said driven member and said plate, a gyratory mass mounted on said driven part, means mounted on said driven part at a position between said plate and said mass and including members having inclined surfaces in contact for converting rotational lag of one of said members with said mass relative to said driven part into axial movement of the other of said members relative to said plate, and means carried by said plate between said other member and said driven member and effecting axial movement of said driven member in a direction away from said driving member in response to movement of said other member toward said plate, the extent of movement being dependent upon the rotational lag of said gyratory mass behind the acceleration of said driven part.

2. A drive for hoisting gear, comprising an electric motor, a driven part, a friction clutch mounted between said motor and said driven part, said clutch consisting of a driving member and a driven member, and a plate secured on the driven part, means resiliently connecting said driven member to said plate, a gyratory mass freely rotatable on said driven part, a sleeve mounted between said gyratory mass and said plate, and formed in two parts having inclined contacting surfaces, frictional means between one of said parts and said mass to urge said one part to follow the rotational lag of said mass relative to the driven part, the other of said parts being axially movable and rotationally fixed relative to said plate, lever means mounted on said plate and rockably actuated by axial movement of said other part of the sleeve, and rod members connected between said lever means and said driven member of the clutch whereby the driven member of said clutch is moved in a direction out of engagement with the driving member in response to movement of said other part of the sleeve toward said plate, said movement of the driven member being dependent upon the lag of the gyratory mass behind the acceleration of the driven part.

3. A drive for hoisting gear, comprising an electric motor, a driven part, a friction clutch mounted between said motor and said driven part, said clutch consisting of a driving member and a driven member, a plate secured on said driven member, casings formed at coincident positions respectively in the opposed faces of said driven member, and said plate, coiled springs mounted under tension in said casings, a gyratory mass mounted to be freely rotatable on said driven part, a flanged sleeve in driving contact with said gyratory mass, and engaging on inclined surfaces in contact, with a co-operating flanged sleeve mounted to be axially movable on said driven part, a lateral projection on said co-operating flanged sleeve engaging in a hole provided in said plate for positive driving of said plate by said sleeve, bell-crank levers mounted on said plate with one arm of each lever in engagement with the flanged surface of said co-operating sleeve and the other arm bearing against the flanged end of a rod secured to said driven member of said clutch and passing through a hole provided in said plate, whereby rotational lag of said mass is effective to cause separation of said sleeves along the inclined surfaces in contact to pivot said lever to cause axial movement of said rod secured to said driven member and said clutch, and movement of said driven member in a direction out of engagement with said driving member, the extent of said movement being dependent upon the rotational lag of said gyratory mass behind the acceleration of said electric motor.

4. A drive for hoisting gear, comprising an electric motor, a driven part, a driving shaft for said motor, means for effecting driving engagement between said shaft and the driving plate of a friction clutch mounted to be freely rotatable on the shaft of said driven part and said shaft being in alignment with the driving shaft of said motor, a driven plate for said clutch in resilient engagement with a plate secured to said driven shaft, a gyratory mass rotatable on said driven shaft, a flanged sleeve in driving engagement with said mass, and bearing with inclined surfaces in contact against a second flanged sleeve mounted for axial movement on said driven shaft, and formed with a lateral projection for positive engagement with said plate, bell-crank levers mounted on said plate, and bearing with one arm of each lever on the surface of said flanged sleeve, and with the other arm engaging a flanged end of a rod secured to the driven plate of said clutch, and an enclosing casing for said drive.

5. A drive for hoisting gear, according to claim 4, in which a coiled spring is provided between said flanged sleeves.

References Cited in the file of this patent

UNITED STATES PATENTS

| | | |
|---|---|---|
| 1,713,713 | Philips | May 21, 1929 |
| 2,079,678 | Chilton | May 11, 1937 |
| 2,086,954 | Fawich | July 13, 1937 |
| 2,109,420 | Guernsey | Feb. 22, 1938 |
| 2,509,061 | Holcomb | May 23, 1950 |

FOREIGN PATENTS

| | | |
|---|---|---|
| 230,843 | Germany | Feb. 7, 1911 |
| 407,142 | Germany | Dec. 15, 1924 |
| 454,697 | France | July 10, 1913 |